United States Patent [19]

Williams et al.

[11] 4,370,308

[45] Jan. 25, 1983

[54] PRODUCTION OF CARBON BLACK

[75] Inventors: Frank R. Williams, Quincy, Mass.; Ronald C. Hurst, Pampa, Tex.

[73] Assignee: Cabot Corporation, Boston, Mass.

[21] Appl. No.: 264,186

[22] Filed: May 15, 1981

[51] Int. Cl.$^3$ .................... C01B 31/02; C09C 1/48
[52] U.S. Cl. ................................................ 423/450
[58] Field of Search ............................ 423/450, 449

[56] References Cited

U.S. PATENT DOCUMENTS 3,408,165  10/1968  Hinson ............................. 23/209.4
3,952,087   4/1976  Antonsen et al. .................. 423/450

FOREIGN PATENT DOCUMENTS 993697  6/1965  United Kingdom ............... 423/450

Primary Examiner—O. R. Vertiz
Assistant Examiner—Gregory A. Heller
Attorney, Agent, or Firm—Jack Schuman; Lawrence A. Chaletsky; Robert J. Feltovic

[57] ABSTRACT

This disclosure relates to an improved furnace process for producing carbon blacks by the incomplete combustion of hydrocarbonaceous feedstock wherein the resultant blacks either have higher surface areas than the carbon blacks normally prepared from the feedstocks or are produced more economically. The blacks produced by the process are suitable for use in all of the typical applications such as rubber plastics, inks and the like.

10 Claims, No Drawings

PRODUCTION OF CARBON BLACK

This invention relates to the production of furnace blacks having many important applications, such as fillers, reinforcing agents, pigments and the like. More particularly, the invention relates to a furnace process suitable either for producing carbon blacks having higher than normal surface areas or for producing standard carbon blacks more economically. In general, the process for preparing the blacks is a furnace process wherein a hydrocarbon feedstock is cracked and/or incompletely combusted in an enclosed conversion zone at temperatures above 1800° F. to produce carbon black. The carbon black entrained in the gases emanating from the conversion zone is then cooled and collected by any suitable means conventionally used in the art.

Accordingly, it is a primary object of this invention to provide a novel and improved process for the production of carbon blacks having surface areas higher than those produced by the process of this invention in the absence of the improvement.

A further object of this invention is to provide an improved furnace process for producing carbon black more economically as measured by increased throughput.

A further object of this invention is to provide an improved furnace process for producing carbon blacks suitable for use in conventional applications including, for example, rubber, plastics, inks, conductive purposes and the like.

Other and different objects, advantages and features of the present invention will become apparent to those skilled in the art upon consideration of the following detailed description and claims.

In accordance with this invention, it has been found that the above and still further objects are achieved by modifying a modular or staged process for producing carbon black as, for example, disclosed and claimed in U.S. Pat. No. Re. 28,974. Such a staged process consists of an initially prepared primary combustion zone wherein a stream of hot gaseous combustion products is formed; a second or transition zone wherein liquid hydrocarbon feedstock in the form of solid streams or coherent jets is injected substantially transversely into the gaseous combustion stream; and a third zone which is the reaction zone where the carbon black is formed prior to termination of the reaction by quenching. The modification of the staged process entails adding a source material selected from the group consisting of calcium, barium and strontium, whether in elemental or chemically combined form. In the present process which is staged or zoned, it is essential that the added material be introduced into the process stream at a point no further downstream than the location of the feedstock injection in the transition zone. While the prior art, such as U.S. Pat. No. 3,408,165 and U.S. Pat. No. 3,413,093, has acknowledged the use of similar materials in a carbon black-producing process, the prior art has also clearly called attention to the necessity for adding the materials into the reaction zone. This is beyond the point where feedstock is injected in the present process and is equivalent to the third stage of the process. As will become evident from the examples hereinafter described, it has been contrarily found that for the present process to be successfully implemented the material must be added prior to the reaction zone.

The amount of the material to be added depends on many factors. For example, the type of black desired, the rate of throughput, the specific material added, and others may affect the amount of material to be added. It has been found that the effectiveness of the added material increases with an increasing quantity until a peak point is reached at which it is uneconomical to introduce further material. In any event, the amount of material added is an amount sufficient to cause the process to either produce carbon blacks of higher than normal surface areas or to produce carbon black more economically as measured by increased throughput. A series of experimental runs described hereinafter has established that the preferred amount of material to be added ranges from about 0.01 to about 0.1 moles per gallon of feedstock utilized in the carbon black process stream.

Following the quenching of the reaction, the carbon black is collected in any of the conventional manners well known in the industry such as, for example, by bag filters alone or by utilizing cyclones together with bag filters. The collected black may then be pelletized in the conventional manner, if desired.

In practicing the present process for producing high surface area blacks, the following operation is observed. A carbon black-yielding liquid hydrocarbon feedstock is injected substantially transversely into a pre-formed stream of hot combustion gases flowing in a downstream direction at an average linear velocity of at least 500 feet per second. The feedstock is injected transversely in the form of coherent jets into the combustion gases from the periphery of the stream to a degree sufficient to achieve penetration and thereby avoid coke formation on the walls of the carbon forming zone of the reactor. In this instance, however, the feedstock will have been injected either into a preformed stream of gaseous combustion products containing an added material thoroughly mixed therewith or together with the additive material. The presence of the added material injected at the proper location, as stated earlier, is critical to the successful operation of the present process. This feature allows the modular process otherwise described herein to be operated so as to produce higher area blacks or to produce standard products more economically.

In the preparation of the hot combustion gases employed in preparing the blacks of the present invention, there are reacted in a suitable combustion chamber a liquid or gaseous fuel and a suitable oxidant stream such as air, oxygen, mixtures of air and oxygen or the like. Among the fuels suitable for use in reacting with the oxidant stream in the combustion chamber to generate the hot combustion gases are included any of the readily combustible gas, vapor or liquid streams such as hydrogen, carbon monoxide, methane, acetylene, alcohols, kerosene. It is generally preferred, however, to utilize fuels having a high content of carbon-containing components and, in particular, hydrocarbons. For example, streams rich in methane such as natural gas and modified or enriched natural gas are excellent fuels as well as other streams containing high amounts of hydrocarbons such as various hydrocarbon gases and liquids and refinery by-products including ethane, propane, butane, and pentane fractions, fuel oils and the like. As referred to herein, the primary combustion represents the amount of oxidant used in the first stage of the modular process relative to the amount of oxidant theoretically required for the complete combustion of the first stage hydrocarbon to form carbon dioxide and water. In this manner there is generated a stream of hot combustion gases flowing at a high linear velocity. It has furthermore been found that a pressure differential between the combustion chamber and the reaction chamber of at least 1.0 p.s.i. (6.9 kPa), and preferably of about 1.5 (10.3 kPa) to 10 (69 kPa) p.s.i., is desirable. Under these conditions, there is produced a stream of gaseous combustion products possessing sufficient energy to convert a carbon black yielding liquid hydrocarbonaceous feedstock to the desired carbon black products. The resultant combustion gas stream emanating from the primary combustion zone attains a temperature of at least about 2400° F. (1316° C.), with the most preferable temperatures being at least above about 3000° F. (1649° C.). The hot combustion gases are propelled in a downstream direction at a high linear velocity which is accelerated by introducing the combustion gases into an enclosed transition stage of smaller diameter which may, if desired, be tapered or restricted such as by means of a conventional venturi throat. It is at this point in the process, which is regarded as the second stage, where the feedstock is forcefully injected into the stream of hot combustion gases.

More particularly, in the second stage where the combustion gases are traveling at high velocity and there exists a gas kinetic head of at least about 1.0 p.s.i. (6.9 kPa), a suitable liquid carbon black-yielding hydrocarbon feedstock is injected into the combustion gases, under sufficient pressure to achieve desired penetration thereby insuring a high rate of mixing and shearing of the hot combustion gases and the liquid hydrocarbon feedstock. As a result of this environment, the liquid hydrocarbon feedstock is rapidly decomposed and converted to carbon black in high yields. Suitable for use herein as hydrocarbon feedstocks which are readily volatilizable under the conditions of the reaction are unsaturated hydrocarbons such as acetylene; olefins such as ethylene, propylene and butylene; aromatics such as benzene, toluene and xylene; certain saturated hydrocarbons; and volatilized hydrocarbons such as kerosenes, naphthalenes, terpenes, ethylene tars, aromatic cycle stocks and the like. The liquid feedstock is injected substantially transversely from the outer or inner periphery, or both, of the stream of hot combustion gases in the form of a plurality of small coherent jets which penetrate well into the interior regions, or core, of the stream of combustion gases but not to a depth such that opposing jets would impinge. In practicing this invention, the hydrocarbon feedstock may readily be introduced as coherent streams of liquid by forcing the liquid feedstock through a plurality of orifices having a diameter ranging from 0.01 (0.25 mm) to 0.15 (3.81 mm) inch, and preferably ranging from 0.02 (0.51 mm) to 0.06 (1.52 mm) inch under an injection pressure sufficient to achieve the desired penetration.

The third stage of the modular process involves the provision of a reaction zone which will permit sufficient residence time for the carbon black forming reaction to occur prior to termination of the reaction by quenching. The residence time in each instance depends upon the particular conditions of the process and the particular black desired. Subsequent to the carbon black forming reaction having proceeded for the desired period of time, the reaction is terminated by spraying thereon a quench liquid, such as water, using at least one set of spray nozzles. The hot effluent gases containing the carbon black products suspended therein are then passed downstream where the steps of cooling, separating and collecting the carbon black are carried out in conventional manner. For example, the separation of the carbon black from the gas stream is readily accomplished by conventional means such as a precipitator, cyclone separator, bag filter, or combinations thereof.

As mentioned hereinbefore, the practice of the above-described process will result either in the production of furnace blacks having higher than normal surface areas or in the production of standard carbon blacks at increased rates of throughput when the additive material is included as an essential operation of the process. It is reemphasized that it is not merely the addition of the material to the process that results in the desired effects, but rather the location in the process stream where the material is introduced. More particularly, the added material must be introduced into the process stream at a point no further downstream than the point where the feedstock is injected into the combustion gas stream. It has been preferred to introduce the added material through the same openings as provided for introducing a source of potassium, a well-known carbon black process control, or for introduction of feedstock. Furthermore, when the added material is introduced into the third zone, or reaction chamber, rather than into the primary combustion gas stream the desired improvement in surface area or throughput is not attained. In the examples of the application, the increased throughput is expressed in the data in terms of the rate of feedstock introduced into a given process to produce a given grade of carbon black.

The following testing procedures are used in evaluating the analytical and physical properties of the blacks produced by the present invention.

Iodine Surface Area

The iodine surface area of a carbon black is determined in accordance with the following procedure and reported in units of square meters per gram ($m^2/g$). A carbon black sample is placed into a size 0 porcelain crucible equipped with a loose-fitting cover to permit escape of gases and is devolatilized or calcined at a temperature of 1700° F. (927° C.) over a period of 7 minutes. The crucible and contents are then cooled in a dessicator, following which the top layer of calcined carbon black to a depth of about one-fourth inch is removed and discarded. From the carbon black remaining in the crucible a convenient sample is weighed, accurate to within 0.1 milligram (mg) and then transferred into a four ounce oil sample bottle. It has been found that for carbon blacks expected to have surface areas in the range of 300 to 750 $m^2/g$ an appropriate sample size is 0.1 gram whereas for blacks having surface areas in excess of 750 $m^2/g$, an appropriate sample size is 0.05 gram. To the bottle containing the carbon black sample there is added 40 milliliters (ml) of 0.0473 N iodine solution. The bottle is covered and the contents are then shaken for ten minutes at a rate of 120 to 260 back and forth trips per minute. The resulting solution is immediately centrifuged at a rate of 1200 to 2000 revolutions per minute (rpm) until the solution becomes clear, this usually covering a period of 1 to 3 minutes. Immediately after centrifuging, a 25 ml aliquot of the iodine solution, to which has been added a few drops of 1% starch solution as an end point indicator, is titrated with 0.0394 N sodium thiosulfate solution until one drop of the sodium thiosulfate solution causes the blue color to become colorless. As a blank, 40 ml of the 0.0473 N iodine solution is shaken, centrifuged and titrated in the same manner as above for the black-containing solution. The iodine surface area, expressed in m²/g, is calculated in accordance with the formula:

$$S.A. = \frac{10(B - T) - 4.57}{1.3375}$$

Wherein B is the titration of the blank and T is the titration of the sample.

Dibutyl Phtalate (DBP) Absorption Number

The DBP absorption number of a carbon black is determined in accordance with ASTM Test Method D 2414-76.

Tint Strength

The tint strength of a carbon black sample is determined relative to an industry tint reference black in accordance with ASTM D3265-76a.

pH Value of Carbon Black

Into a suitable Erlenmeyer flask there are placed a 5 gram sample of carbon black and 50 ml of distilled water. The carbon black-containing water mixture is brought to a boiling point using an electric hot plate, and maintained at a slow boil for a period of 10 minutes but not such as to cause dryness to occur. The resulting mixture is cooled to room temperature and the pH thereof is then determined utilizing a pH meter equipped with glass and calomel electrodes having an accuracy of ±0.05 pH units. Prior to determining the pH of the carbon black, the pH meter is calibrated against two buffer solutions, one having a pH of 4.0 and the other having a pH of 7.0.

Iodine Adsorption Number

This is determined in accordance with ASTM D-1510-70.

The invention will be more readily understood by reference to the following examples. There are, of course, many other forms of this invention which will become obvious to one skilled in the art, once the invention has been fully disclosed, and it will accordingly be recognized that these examples are given for the purpose of illustration only, and are not to be construed as limiting the scope of this invention in any way.

EXAMPLES 1-13

In the following series of runs, reported as Examples 1-13, there is employed a suitable reaction apparatus provided with means for supplying combustion gas-producing reactants, i.e., a fuel and an oxidant, either as separate streams or as precombusted gaseous reaction products to the primary combustion zone, and also means for supplying both the carbon black-yielding hydrocarbonaceous feedstock and the combustion gases to be introduced downstream to the apparatus, and means for introducing the additive material into the combustion gases. The apparatus may be constructed of any suitable material such as metal and either provided with refractory insulation or surrounded by cooling means such as a recirculating liquid which is preferably water. Additionally, the reaction apparatus is equipped with temperature and pressure recording means, means for quenching the carbon black-forming reaction such as spray nozzles, means for cooling the carbon black product and means for separating and recovering the carbon black from other undesired by-products.

In a more detailed description of the apparatus utilized herein, the first stage is employed so as to obtain a substantially completely pre-formed combustion prior to feedstock injection. As a suitable burner there is provided an enclosed reaction vessel having a diameter of 20 inches for a length of 42.5 inches which is then gradually reduced in a conical manner over the next 10.25 inches to a diameter of 16 inches. Connected to the first zone, or burner section, is a second zone referred to as the transition zone having a diameter of 5.3 inches and a length of 11 inches. It is in this zone that the liquid feedstock is injected as coherent streams through as many orifices as desired. The feedstock is injected under conditions sufficient to assure a proper degree of penetration into the combustion gas stream thereby avoiding problems of coke formation in the reactor. The resultant hot gas stream then enters a third zone, referred to as the reaction zone, where the carbon black is formed. This zone extends to the point where the reaction is quenched. In the present instance the reaction zone has a diameter of 6 inches and a length of 48 inches. In the runs of this series where the additive material is introduced into the primary combustion gas stream, the point of introduction is either by means of a probe having an outlet located 48 inches upstream of the point where feedstock is injected or at the point where the feedstock is introduced. For comparative purposes, the runs with additive material introduced into the reactor section were carried out using a probe having an outlet located at a point 9 inches downstream of the point of feedstock injection.

The natural gas employed in this series of runs has the following composition expressed as volume percent: $N_2$—1.90; $C_1$—94.51; $CO_2$—0.53; $C_2$—2.52; $C_3$—0.38; iso-$C_4$—0.07; and n-$C_4$—0.008. Moreover, it is necessary to use 9.56 s.c.f. of air for the complete combustion of 1 s.c.f. of the natural gas. The feedstock used in all runs except 10 and 13 is Exxon R which is a fuel having by weight a hydrogen content of 7.96%, a carbon content of 88.9%; a sulfur content of 2.7%; a nitrogen content of 0.12%; a hydrogen to carbon ratio of 1.07; an API gravity at 60° F. of −0.9; a specific gravity (ASTM D287) at 60° F. of 1.08; an SSU viscosity (ASTM D88) at 130° F. of 597; an SSU viscosity at 210° F. of 69.8; a BMCI of 125; and an asphaltenes content of 3.5%. For the runs of the series 10 and 13, the feedstock is Exxon Oil R, which is a fuel having by weight a hydrogen content of 8.13%; a carbon content of 88.8%; a sulfur content of 2.6%; an API gravity at 60° F. of −0.2; a specific gravity at 60° F. of 1.078; an SSU viscosity at 130° F. of 561; an SSU viscosity at 210° F. of 67.9; a BMCI of 123; and an asphaltenes content of 2.9%.

Further details concerning the process of the invention and the products resulting from the process, according to examples 1-13, are found in the following Tables I and II. In all of Examples 1-13 the feedstock is injected through 6 oil tips, each of which has a size of 0.016 inch.

TABLE I

| | Example No. | | | | | | | | | | | | |
|---|---|---|---|---|---|---|---|---|---|---|---|---|---|
| | 1 | 2 | 3 | 4 | 5 | 6 | 7 | 8 | 9 | 10 | 11 | 12 | 13 |
| Feedstock Rate, gph | 54.9 | 66.2 | 57.7 | 54.9 | 55 | 67.9 | 55.2 | 54.7 | 68.4 | 54.4 | 55.1 | 61.3 | 71.4 |
| Feedstock Pressure psig | 540 | 780 | 580 | 540 | 520 | 810 | 520 | 540 | 840 | 540 | 545 | 660 | 905 |
| Feedstock preheat, °F. | 340 | 330 | 352 | 345 | 345 | 330 | 330 | 345 | 320 | 350 | 345 | 345 | 350 |
| Combustion Air, kscfh | 79.32 | 79.32 | 78.9 | 79.32 | 78.9 | 78.9 | 79.32 | 79.32 | 79.32 | 79.06 | 80.1 | 80.1 | 79.06 |
| Natural gas, kscfh | 9.05 | 9.05 | 9.05 | 9.05 | 9.05 | 9.05 | 9.05 | 9.05 | 9.05 | 9.12 | 9.18 | 9.18 | 9.12 |
| Calcium Acetate, moles/gal.oil | — | .0235 | .027 | .0282 | .0282 | .0227 | — | .0282 | .0227 | .0569 | .014 | .0127 | .031 |
| Location of Additive Injection, relative to point of feedstock inj., inches | — | 48 in upstream in burner | 9 in downstream in furnace | 48 in upstream in burner | 9 in downstream in furnace | 48 in upstream in burner | — | At point of oil inject. | At point of oil inject. | 48 in upstream in burner | At point of oil inject. | At point of oil inject. | 48 in upstream in burner |
| Quench, relative to feedstock injection, inches | 54 | 54 | 54 | 54 | 54 | 54 | 54 | 54 | 54 | 54 | 54 | 54 | 54 |
| Quench Temp. °F. | 1000 | 1000 | 1000 | 1000 | 1000 | 1000 | 1000 | 1000 | 1000 | 1490 | 1400 | 1400 | 1460 |
| % Primary Combustion | 119.2 | 119.9 | 119.4 | 119.9 | 119.4 | 119.4 | 118.3 | 118.3 | 118.3 | 120.8 | 117.1 | 117.1 | 120.8 |
| % Overall Combustion | 60.2 | 54.6 | 58.7 | 60.6 | 60.3 | 54 | 59.7 | 60 | 53.4 | 61.6 | 59.7 | 56.6 | 61 |
| Excess Oxygen, scfh | 5002 | 5002 | 5002 | 5002 | 5002 | 5002 | 5002 | 5002 | 5002 | 5002 | 5002 | 5002 | 5002 |
| % Oxygen in Combustion Air | 25.7 | 25.7 | 25.7 | 25.7 | 25.7 | 25.7 | 25.7 | 25.7 | 25.7 | 25.7 | 25.7 | 25.7 | 25.7 |
| Air Preheat, °F. | 730 | 730 | 742 | 730 | 735 | 735 | 720 | 720 | 720 | 740 | 735 | 735 | 740 |

TABLE II

| Carbon Black of Run No. | Iodine Surface Area, Fluffy, m²/g | Tint, % Fluffy | DBP, Fluffy, cc/100g |
|---|---|---|---|
| 1 | 456 | — | — |
| 2 | 495 | — | — |
| 3 | 474 | — | — |
| 4 | 555 | 142 | 154 |
| 5 | 468 | 142 | 150 |
| 6 | 435 | 146 | 149 |
| 7 | 444 | 134 | 140 |
| 8 | 564 | 140 | 152 |
| 9 | 434 | 146 | 148 |
| 10 | 588 | — | — |
| 11 | 516 | — | 156 |
| 12 | 450 | — | 149 |
| 13 | 477 | — | — |

The data reported in the tables illustrate many of the findings of the present invention. The comparisons have been drawn between runs carried out as closely as possible. For example, in comparing run no. 1 with runs nos. 4 and 6, respectively, it is noted that introducing calcium acetate into the burner either permits the surface area of the black to be significantly increased or the throughput of a given black to be increased, as measured by the increase in the rate at which the feedstock may be introduced into the process.

A comparison of runs nos. 7, 8, and 9 show the same effect of adding calcium acetate, with the additive being injected at the same point where the feedstock enters. To be more specific, a review of runs 7 and 8 illustrate the significant increase in surface area achieved by means of the present invention. Comparing the data of run 9 with the data of run 7 shows the increased throughput attained by the present process.

Runs nos. 4 and 5 are compared to show the effects obtained when adding equal amounts of calcium acetate into the burner or into the furnace. A review of the data readily reveals the marked difference in surface areas. Moreover, run no. 5, with the calcium acetate added into the furnace, essentially results in a process equivalent to the control run no. 1 wherein no calcium acetate is added, both as to surface area and throughput. This is also shown when comparing runs nos. 2 and 3 wherein an essentially similar amount of calcium acetate added into the burner causes an increased throughput relative to additions into the furnace.

In order to determine the effects resulting from varying the amount of calcium acetate added, a comparison may be made of runs nos. 1, 11, 8, 4 and 10. The result of such a comparison is the fact that the surface area of a black is raised still further when larger amounts of calcium acetate are added. However, there is to be considered the matter of performance improvements relative to cost in each situation. There is also revealed by comparing the data of runs nos. 1, 12, 6, 9 and 13, that increasing the amount of calcium acetate added will increase the throughput of a given grade of black. Here again, however, the cost of the amount of calcium acetate used in each instance must be balanced against the improvements in performance.

EXAMPLES 14 AND 15

The following two Examples numbered 14 and 15 are included to illustrate that similar effects are found during the production of blacks having lower surface areas than those of Examples 1-13. In the two runs nos. 14 and 15 the reaction apparatus is identical to that used in runs nos. 1-13 except for the transition zone having a diameter of 6.3 inches and a length of 8.7 inches and a different reaction zone. The reaction zone utilized herein consists of a section having a diameter of 9 inches and a length of 13.5 inches followed by a section having a diameter of 13.5 inches and a length of 90 inches which then opens into a section having a diameter of 18 inches and a length of 46.5 inches and finally, a section having a diameter of 27 inches and a length of 36 inches.

In carrying out runs nos. 14 and 15 there is used as feedstock a Shamrock oil having by weight a hydrogen content of 8.42%, a carbon content of 91.2%, a hydrogen to carbon (H/C) ratio of 1.10, a sulfur content of 0.5%, an asphaltenes content of 4.8%, an API gravity at 60° F. of 1.6, a specific gravity (ASTM D287) at 60° F. of 1.063, an SSU viscosity (ASTM D88) at 130° F. of 386.7, an SSU viscosity at 210° F. of 56.5 and a BMCI of 117. The natural gas utilized in the runs has the following composition expressed as volume percent: $N_2$—6.35; $CO_2$—0.152; $C_1$—90.94; $C_2$—2.45; $C_3$—0.09;

iso-$C_4$—0.018; n-$C_4$—0.019. Furthermore, it is noted that it is necessary to use 9.10 s.c.f. of air to completely combust 1 s.c.f. of the natural gas. Further details will become apparent from the data reported in Table III. In particular, it will be noted that the injection of calcium nitrate upstream in the burner significantly increases the throughput of the production of a given black, as measured by the increased oil injection rates.

TABLE III

| Run No. | 14 | 15 |
|---|---|---|
| Combustion Air, kscfh | 89.9 | 89.9 |
| Calcium Nitrate, moles/gal. feedstock | — | .0512 |
| Natural Gas, kscfh | 5.28 | 5.27 |
| Feedstock, gph | 112 | 160 |
| Oil Tips, no./size, inches | 4 × .041 | 4 × .052 |
| Oil Pressure | 210 | 150 |
| Potassium, gm/100 gals. oil | 0.4 | — |
| Quench, relative to oil injection, inches | 190.3 | 190.3 |
| Air Preheat, °F. | 700 | 1185 |
| % Primary Combustion | 188.5 | 188 |
| % Overall Combustion | 40.7 | 30.3 |
| Feedstock Preheat, °F. | 450 | 450 |
| Quench Temperature, °F. | 1350 | 1400 |
| Air/Gas, scf/scf | 17.2 | 17.1 |
| Iodine Number, pellets | 158 | 160 |
| DBP, pellets, cc/100g | 112 | 122 |
| Tint, pellets, % | 107.8 | 109.6 |

EXAMPLES 16-18

The following series of runs nos. 16, 17 and 18 show that the present invention is also useful in preparing very high surface area blacks. Here again, the injection of calcium chloride upstream into the burner section of the apparatus produces either an increased surface area black or an increased throughput for the process.

In carrying out runs nos. 16, 17 and 18 the reaction apparatus is composed of a burner section as used in Examples 1-15. The transition zone, however, has a diameter of 5.3 inches and a length of 8.7 inches and the furnace portion has a diameter of 36 inches for a length of 264 inches, followed by a section having a diameter of 27 inches for a length of 60 inches and a final section having a diameter of 18 inches and a length of 60 inches.

The feedstock used in this series of runs is Sunray DX which is a fuel having by weight a hydrogen content of 8.67%, a carbon content of 89.8%, a hydrogen to carbon (H/C) ratio of 1.15, a sulfur content of 1.4%, an asphaltenes content of 3.4%, an API gravity at 60° F. of 0.0, a specific gravity (ASTM D287) at 60° F. of 1.076, an SSU viscosity (ASTM D88) at 130° F. of 611, an SSU viscosity at 210° F. of 67.9, and a BMCI of 122. The natural gas used herein has the following composition expressed as volume percent: $N_2$—8.82; $CO_2$—0.04; $C_1$—87.28; $C_2$—3.57; $C_3$—0.21; iso-$C_4$—0.02; n-$C_4$—0.04; iso-$C_5$—0.01; and n-$C_5$—0.01. Additional data is found in Table IV from which it is apparent that adding calcium chloride into the burner section permits either increase of the area level of already high area blacks or an increased throughput of the very high area blacks.

TABLE IV

| Run No. | 16 | 17 | 18 |
|---|---|---|---|
| Oil Tips, No.; Size, inches | 2 × .022<br>2 × .020 | 4 × .022 | 4 × .022 |
| Feedstock, gph | 47 | 61 | 53 |
| Feedstock Pressure, psig | 230 | 320 | 213 |
| Feedstock Preheat, °F. | 310 | 300 | 290 |
| Combustion Air, kscfh | 70.1 | 70.1 | 70.1 |
| Air Preheat, °F. | 755 | 740 | 750 |

TABLE IV-continued

| Run No. | 16 | 17 | 18 |
|---|---|---|---|
| Natural Gas, kscfh | 6.66 | 6.65 | 6.71 |
| Quench, relative to oil injection, inches | 388.3 | 388.3 | 388.3 |
| Quench Temperature, °F. | 1380 | 1330 | 1350 |
| Calcium Chloride, moles/gal. oil | — | .0838 | .0964 |
| % Primary Combustion | 117 | 117 | 116 |
| % Overall Combustion | 52.8 | 45.7 | 50.2 |
| Iodine Surface Area, $m^2/g$, fluffy | 1005 | 1054 | 1210 |
| DBP, fluffy, cc/100g | 303 | 292 | 300 |

EXAMPLES 19-23

The next series of runs nos. 19-23 illustrate the effects resulting from the use of materials containing barium and strontium as well as calcium. In all instances the productivity of the process is increased as evidenced by increased feedstock rates. The additive material in all of the runs of this series is introduced upstream into the burner section of the apparatus.

The reaction apparatus utilized in runs nos. 19-23 is composed of a burner and transition sections identical to that of runs nos. 16-18. The furnace section, however, has a diameter of 9 inches and a length of 72 inches. The feedstock utilized is Sunray DX which is a fuel having by weight a hydrogen content of 8.67%, a carbon content of 89.8%, a hydrogen to carbon (H/C) ratio of 1.15, a sulfur content of 1.4%, an asphaltenes content of 3.4%, an API gravity of 60° F. of 0.0, a specific gravity of 60° F. of 1.076, an SSU viscosity at 130° F. of 611, an SSU viscosity at 210° F. of 67.9, and a BMCI of 122. The natural gas used herein has the following composition expressed as volume percent: $N_2$—9.75; $CO_2$—0.35; $C_1$—87.40; $C_2$—2.40; $C_3$—0.08; iso-$C_4$—0.01; and n-$C_4$—0.01. Additional information is found in Table V wherein the additive is injected into the burner section in all cases.

TABLE V

| Run No. | 19 | 20 | 21 | 22 | 23 |
|---|---|---|---|---|---|
| Oil Tips, No.; Size inches | 4 × .043 | 4 × .039 | 4 × .039 | 4 × .039 | 4 × .039 |
| Feedstock Rate, gph | 116 | 124 | 121 | 121 | 122 |
| Feedstock Pressure, psig | 202 | 255 | 243 | 253 | 248 |
| Feedstock Preheat, °F. | 480 | 495 | 490 | 490 | 490 |
| Combustion Air, kscfh | 89.9 | 89.9 | 89.9 | 89.9 | 89.9 |
| Air Preheat, °F. | 740 | 755 | 750 | 750 | 740 |
| Natural Gas, kscfh | 8.35 | 8.27 | 8.29 | 8.28 | 8.28 |
| Quench, relative to oil injection, inches | 76.3 | 76.3 | 76.3 | 76.3 | 76.3 |
| Quench Temperature, °F. | 1240 | 1260 | 1260 | 1260 | 1260 |
| Air/Gas Ratio, scf/scf | 10.8 | 10.9 | 10.9 | 10.9 | 10.9 |
| % Primary Combustion | 123.1 | 124.3 | 124.1 | 124.1 | 124.2 |
| % Overall Combustion | 35.2 | 33.8 | 34.3 | 34.4 | 34.2 |
| Calcium Acetate, moles/gal. oil | — | — | .0442 | — | — |
| Calcium Nitrate, moles/gal. oil | — | — | — | .0442 | — |
| Barium Acetate, moles/gal. oil | — | .0431 | — | — | — |
| Strontium nitrate, moles/gal. oil | — | — | — | — | .0439 |
| Iodine Number | 120 | 118 | 118 | 113 | 115 |
| Iodine Surface Area, $m^2/g$ | 95 | 102 | 95 | 95 | 100 |
| Tint Strength, % | 126 | 123 | 127 | 124 | 122 |
| DBP, pellets, cc/100 g | 125 | 122 | 124 | 124 | 123 |
| DBP, fluffy, cc/100 g | 133 | 136 | 130 | 132 | 135 |

From the above data it is evident that the use of barium and strontium-containing materials, as well as calcium-containing materials, when added into the burner section of the staged process for producing black achieve the desired objectives. In the foregoing Examples 19-23, there is shown the improved throughput resulting from incorporating the various materials.

As mentioned earlier, the blacks produced by the present process may be utilized in all conventional applications well-known in the different industries. These include applications in rubber, plastics, inks and the like.

While this invention has been described with respect to certain embodiments, it is not so limited, and it should be understood that variations and modifications thereof may be made which are obvious to those skilled in the art without departing from the spirit or scope of the invention.

The embodiments of the invention in which an exclusive property or privilege is claimed are defined as follows:

1. In a modular process for producing furnace carbon blacks wherein a fuel and an oxidant are reacted in a first zone so as to provide a stream of hot primary combustion gases possessing sufficient energy to convert a carbon black-yielding liquid hydrocarbon feedstock to carbon black, and wherein in a second zone the liquid hydrocarbon feedstock is peripherally injected, in the form of a plurality of coherent jets, into the stream of gaseous combustion products in a direction substantially transverse to the direction of flow of the stream of combustion gases and under sufficient pressure to achieve the degree of penetration required for proper shearing and mixing of the feedstock, and wherein in a third zone the feedstock is decomposed and converted into carbon black prior to termination of the carbon forming reaction by quenching, and then cooling, separating and recovering the resultant carbon black, the improvement which comprises introducing into the primary combustion gases at a point no further downstream than the point at which the feedstock is injected a material, in elemental or chemically combined form, selected from the group consisting of calcium, barium and strontium, in an amount sufficient to either increase the surface area of the blacks or increase the throughput of the process.

2. A process as defined in claim 1 wherein the amount of the material introduced ranges from about 0.01 to about 0.1 moles of material per gallon of feedstock.

3. A process as defined in claim 1 wherein the material is introduced upstream of the point where the feedstock is injected.

4. A process as defined in claim 1 wherein the material is introduced at the point where the feedstock is injected.

5. A process as defined in claim 1 wherein the material introduced is calcium-containing, in elemental or chemically combined form.

6. A process as defined in claim 1 wherein the material introduced is calcium acetate.

7. A process as defined in claim 1 wherein the material introduced is calcium nitrate.

8. A process as defined in claim 1 wherein the material introduced is calcium chloride.

9. A process as defined in claim 1 wherein the material introduced is barium acetate.

10. A process as defined in claim 1 wherein the material introduced is strontium nitrate.

* * * * *